(12) United States Patent
Ye et al.

(10) Patent No.: US 11,411,939 B2
(45) Date of Patent: Aug. 9, 2022

(54) SELECTIVE ENCRYPTION CONFIGURATION

(71) Applicant: ServiceNow, Inc., Santa Clara, CA (US)

(72) Inventors: Antonio Ye, San Diego, CA (US); Kyle Barron-Kraus, San Diego, CA (US)

(73) Assignee: ServiceNow, Inc., Santa Clara, CA (US)

( * ) Notice: Subject to any disclaimer, the term of this patent is extended or adjusted under 35 U.S.C. 154(b) by 44 days.

(21) Appl. No.: 16/417,289

(22) Filed: May 20, 2019

(65) Prior Publication Data

US 2019/0342272 A1 Nov. 7, 2019

Related U.S. Application Data

(63) Continuation of application No. 15/190,613, filed on Jun. 23, 2016, now Pat. No. 10,320,761.
(Continued)

(51) Int. Cl.
*H04L 29/00* (2006.01)
*H04L 9/40* (2022.01)
(Continued)

(52) U.S. Cl.
CPC ........ *H04L 63/0471* (2013.01); *G06F 21/602* (2013.01); *G06F 21/6218* (2013.01); *H04L 63/0281* (2013.01); *H04L 63/0428* (2013.01)

(58) Field of Classification Search
CPC ............. H04L 63/0471; H04L 63/0281; G06F 21/602; G06F 21/6218
(Continued)

(56) References Cited

U.S. PATENT DOCUMENTS 5,063,523 A * 11/1991 Vrenjak .................. H04L 41/06
709/223
6,978,367 B1 12/2005 Hind et al.
(Continued)

FOREIGN PATENT DOCUMENTS

EP 1310115 B1 4/2006
EP 1562099 A1 8/2006
(Continued)

OTHER PUBLICATIONS

Weng, Jian, et al.; "Conditional Proxy Re-Encryption Secure Against Chosen-Ciphertext Attack", ASIACC Mar. 10, 2009, Sydney, NSW, Australia, 11 pp.
(Continued)

*Primary Examiner* — Jeffrey C Pwu
*Assistant Examiner* — Michael D Anderson
(74) *Attorney, Agent, or Firm* — Fletcher Yoder PC

(57) ABSTRACT

Encoding a partially encrypted data stream may include receiving, at an edge encryption proxy, an unencrypted data stream, evaluating the unencrypted data stream using communication encryption rules including rule conditions and content mappings, determining whether the rule conditions match on the unencrypted data stream, and on a condition that the rule condition matches on the unencrypted data stream, and identifying a portion of the unencrypted data stream corresponding to the content mapping as a candidate sensitive portion. On a condition that the data encryption configuration information indicates that a data storage container corresponding to a matching content mapping is configured for storing sensitive information, generating an encrypted portion by encrypting the candidate sensitive portion, generating a partially encrypted data stream, including the encrypted portion, and unencrypted insensitive portions of the unencrypted data stream, and omitting the
(Continued)

candidate sensitive portion, and transmitting or storing the partially encrypted data stream.

19 Claims, 9 Drawing Sheets

Related U.S. Application Data

(60) Provisional application No. 62/249,849, filed on Nov. 2, 2015.

(51) Int. Cl.
*G06F 21/60* (2013.01)
*G06F 21/62* (2013.01)

(58) Field of Classification Search
USPC .......................................................... 713/153
See application file for complete search history.

(56) References Cited

U.S. PATENT DOCUMENTS

| | | | |
|---|---|---|---|
| 7,020,706 B2 | 3/2006 | Cates | |
| 7,076,521 B2 | 7/2006 | Davison et al. | |
| 7,165,175 B1 | 1/2007 | Kollmyer et al. | |
| 7,536,391 B2 | 5/2009 | Christian et al. | |
| 7,716,353 B2 | 5/2010 | Golovinsky | |
| 7,769,718 B2 | 8/2010 | Murley | |
| 7,797,342 B2 | 9/2010 | Banks et al. | |
| 7,805,464 B2 | 9/2010 | McKee et al. | |
| 7,925,981 B2 | 4/2011 | Pourheidari | |
| 8,135,948 B2 | 3/2012 | Shulman et al. | |
| 8,266,438 B2 | 9/2012 | Orsini et al. | |
| 8,402,127 B2 | 3/2013 | Solin | |
| 8,526,612 B2 | 9/2013 | MacLean et al. | |
| 8,533,328 B2 | 9/2013 | Jeon | |
| 8,612,408 B2 | 12/2013 | Trinon | |
| 8,694,646 B1 | 4/2014 | Kothari et al. | |
| 8,832,652 B2 | 9/2014 | Mueller | |
| 8,966,250 B2* | 2/2015 | Shochet | H04L 9/0662 713/165 |
| 9,098,322 B2 | 8/2015 | Apte | |
| 9,317,327 B2 | 4/2016 | Apte | |
| 9,363,252 B2 | 6/2016 | Mueller | |
| 9,645,833 B2 | 5/2017 | Mueller | |
| 9,654,473 B2 | 5/2017 | Miller | |
| 9,680,846 B2* | 6/2017 | Haugsnes | G06F 16/24 |
| 9,766,935 B2 | 9/2017 | Kelkar | |
| 9,805,322 B2 | 10/2017 | Kellkar | |
| 2002/0112167 A1* | 8/2002 | Boneh | H04L 63/0428 713/182 |
| 2003/0014528 A1 | 1/2003 | Crutcher et al. | |
| 2004/0181679 A1 | 9/2004 | Dettinger et al. | |
| 2006/0210071 A1* | 9/2006 | Chandran | H04L 63/0428 380/42 |
| 2008/0250242 A1 | 10/2008 | Bhogal et al. | |
| 2012/0072918 A1 | 3/2012 | Zhong et al. | |
| 2012/0124372 A1 | 5/2012 | Dilley et al. | |
| 2012/0204036 A1 | 8/2012 | Wack et al. | |
| 2012/0278621 A1* | 11/2012 | Woloszyn | G06F 21/10 713/168 |
| 2013/0275768 A1* | 10/2013 | Orsini | G06F 21/606 713/189 |
| 2014/0373165 A1* | 12/2014 | Margolin | G06F 21/606 726/26 |

FOREIGN PATENT DOCUMENTS

| | | |
|---|---|---|
| WO | 200201389 A2 | 1/2002 |
| WO | 2010029559 A1 | 3/2010 |

OTHER PUBLICATIONS

Unicode: Frequently Asked Questionsk "Private-Use-Characters, Noncharacters & Sentinels FAQ", downloaded Jun. 10, 2016, 12 pp., http://www.unicode.org/faq/private_use.html.

\* cited by examiner

SELECTIVE ENCRYPTION CONFIGURATION

CROSS-REFERENCE TO RELATED APPLICATION(S)

This is a continuation application of U.S. patent application Ser. No. 15/190,613, filed on Jun. 23, 2016, which claims priority to U.S. Provisional Patent Application No. 62/249,849, filed on Nov. 2, 2015, which is herein incorporated by reference in its entirety.

TECHNICAL FIELD

The present disclosure is generally related to information technology, including computer-implemented methods, systems, and apparatuses to identify portions of a data stream for selective encryption in an electronic computing and communication system.

BACKGROUND

An electronic computing and communication system may include one or more communicating and computing elements, which may, in the course of communicating and computing, exchange messages including a mixture of sensitive and insensitive data. Accordingly, a method and apparatus for selectively encrypting portions of a data stream may be advantageous.

SUMMARY

Disclosed herein are aspects of selective encryption configuration.

According to an implementation, a method is provided for selectively encrypting portions of a data stream, comprising receiving, at an edge encryption proxy, an unencrypted data stream, and evaluating the unencrypted data stream using communication encryption rules, wherein each communication encryption rule from the communication encryption rules includes a rule condition and a content mapping. Evaluating the unencrypted data stream using the communication encryption rules may include determining whether the rule condition matches on the unencrypted data stream, and on a condition that the rule condition matches on the unencrypted data stream, identifying a portion of the unencrypted data stream corresponding to the content mapping as a candidate sensitive portion, identifying a data storage container based on the content mapping, identifying data encryption configuration information corresponding to the data storage container, and on a condition that the data encryption configuration information indicates that the data storage container is configured for storing sensitive information, identifying the candidate sensitive portion as a sensitive portion, generating an encrypted portion by encrypting the sensitive portion, including a preceding portion of the unencrypted data stream in a partially encrypted data stream, the preceding portion preceding the sensitive portion in the unencrypted data stream, including the encrypted portion in the partially encrypted data stream subsequent to the preceding portion, and including a subsequent portion of the unencrypted data stream in the partially encrypted data stream subsequent to the encrypted portion, the subsequent portion subsequent to the sensitive portion in the unencrypted data stream. The method for selectively encrypting portions of a data stream may include transmitting or storing the partially encrypted data stream.

According to an implementation, a method is provided for selective encryption, comprising receiving, at an edge encryption proxy in a first network, an unencrypted data stream, from a client device in the first network, and wherein the unencrypted data stream indicates a recipient, wherein the recipient is an external device in a different network, generating a partially encrypted data stream by selectively encrypting the unencrypted data stream based on communication encryption rules and data encryption configuration information, wherein a sensitive portion of the unencrypted data stream is omitted from the partially encrypted data stream, and wherein an encrypted portion generated by encrypting the sensitive portion is included in the partially encrypted data stream, and transmitting the partially encrypted data stream to the recipient such that recipient is prevented from decrypting the encrypted portion and the encrypted portion is stored as encrypted data.

According to an implementation, a non-transitory computer-readable storage medium, comprising executable instructions that, when executed by a processor, facilitate performance of operations, comprising receiving, at an edge encryption proxy in a first network, an unencrypted data stream, from a client device in the first network, and wherein the unencrypted data stream indicates a recipient, wherein the recipient is an external device in a different network, generating a partially encrypted data stream by selectively encrypting the unencrypted data stream based on communication encryption rules and data encryption configuration information, wherein a sensitive portion of the unencrypted data stream is omitted from the partially encrypted data stream, and wherein an encrypted portion generated by encrypting the sensitive portion is included in the partially encrypted data stream, and transmitting the partially encrypted data stream to the recipient such that recipient is prevented from decrypting the encrypted portion and the encrypted portion is stored as encrypted data.

These and other aspects of the present disclosure are disclosed in the following detailed description of the embodiments, the appended claims and the accompanying figures.

BRIEF DESCRIPTION OF THE DRAWINGS

The description herein makes reference to the accompanying drawings wherein like reference numerals refer to like parts throughout the several views.

DETAILED DESCRIPTION

An electronic computing and communication system may include many elements, such as computers, routers, switches, servers, and the like, in communication internally, within the electronic computing and communication system or network domain, and externally, with elements outside the electronic computing and communication system or network domain. The communications may include sensitive information. In order to prevent unauthorized access to the sensitive information, the sensitive information may be encrypted. Thus, the communications may include a mixture of unencrypted and encrypted data. Accordingly, the methods and apparatus disclosed herein may enable the low cost, low latency, identification of portions of data streams for encryption.

The preceding overview is provided to enable a basic or general understanding of various aspects of the non-limiting embodiments that follow and the accompanying drawings. This overview is not intended as an exhaustive or complete description. Instead, the purpose of this overview is to introduce some concepts of this disclosure as a prelude to the following more detailed descriptions of the various embodiments.

Figure 1:
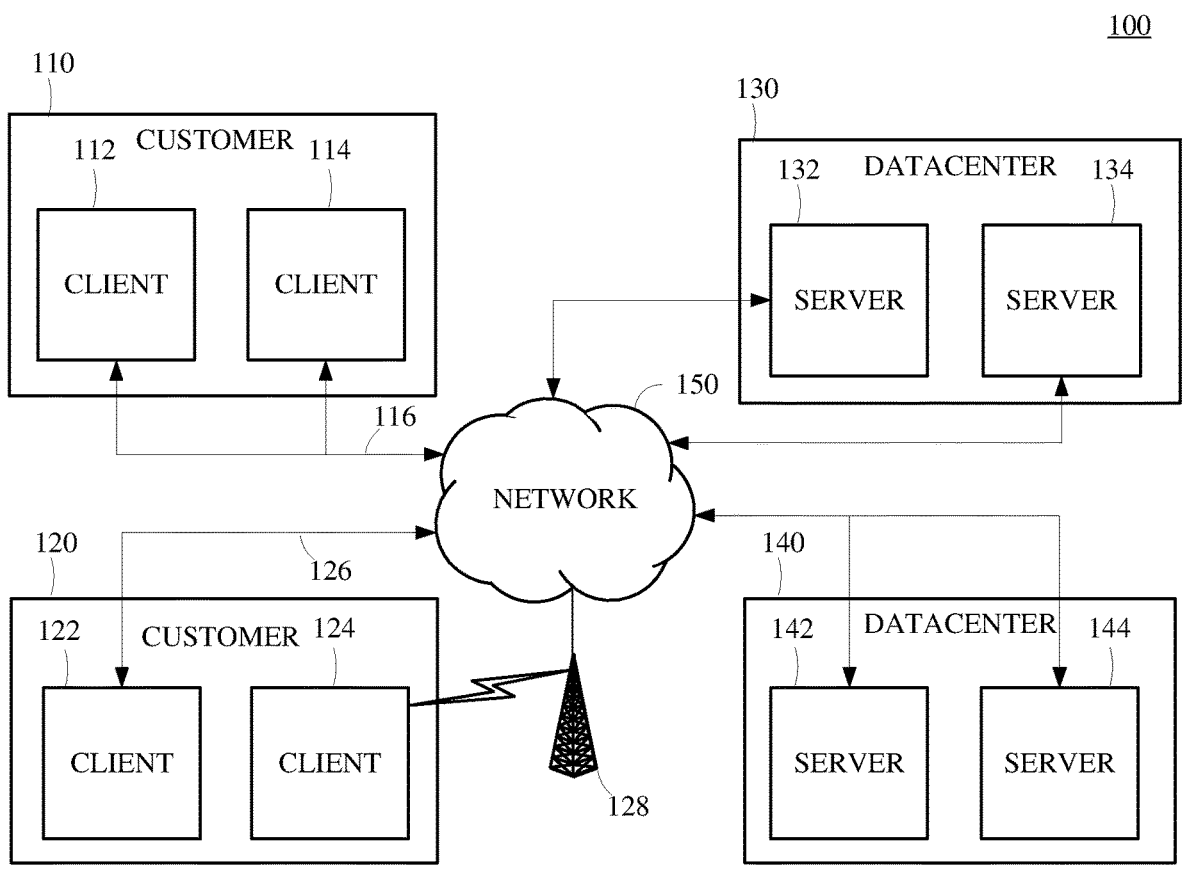
FIG. 1 is a block diagram of a networked distributed or cloud computing system in which the teachings herein may be implemented.

FIG. 1 is a diagram of an example of an electronic computing and communication system 100 in accordance with this disclosure. As used herein, the term 'electronic computing and communication system', or variations thereof, may be, or include, a distributed computing system, such as a client-server computing system, a cloud computing system, a clustered computing system, or the like.

An electronic computing and communication system 100 can include customers, such as customers 110 and 120. A customer may have clients, such as clients 112, 114 for customer 110 and clients 122, 124 for customer 120. A client 112/114/122/124 may be a computing system, which may include one or more computing devices, such as a mobile phone, a tablet computer, a laptop computer, a notebook computer, a desktop computer, or any other computing device, or combination of computing devices. In some embodiments, client be implemented as a single physical unit, or a combination of physical units. In some embodiments, a single physical unit may include multiple clients. For example, a client 112/114/122/124 may be an instance of an application or program running on a customer device. Although two customers 110/120, each having two clients 112/114/122/124, are shown in FIG. 1, an electronic computing and communication system may include any number of customers or clients or may have a different configuration of customers or clients. For example, there may be hundreds or thousands of customers and each customer may have any number of clients. Although not shown separately in FIG. 1, a customer 110/120 may include a customer network or domain. For example, the clients 112/114 of a customer 110, may be within a customer network or domain.

The electronic computing and communication system 100 can include one or more datacenters, such as the two datacenters 130/140 shown. A datacenter may include servers, such as the two servers 132/134 shown for datacenter 130, or the two servers 142/144 shown for bottom datacenter 140. A datacenter 130/140 may represent a geographic location, which may include a facility, where servers are located. A server 132/134/142/144 may be a computing system, which may include one or more computing devices, such as a desktop computer, a server computer, or any other computer capable of operating as a server. Although two datacenters 130/140, each including two servers 132/134/142/144 are shown in FIG. 1, an electronic computing and communication system may have any number of datacenters and servers or may have a different configuration of datacenters and servers. For example, there may be tens of data centers and each data center may have hundreds or any number of servers. Although not shown expressly in FIG. 1, each datacenter 130/140 may correspond with one or more datacenter networks or domains, which may be domains other than the client domain.

Clients 112/114/122/124 and servers 132/13/142/144 may be configured to connect to, or communicate via, a network 150. In some implementations, the clients 112/114 of a customer 110 may connect to the network 150 via a communal connection point, link, or path 116. In some implementations, one or more clients 122/124 of a customer 120 may connect to, or communicate via, the network 150 using distinct connection points, links, or paths 126/128. A connection point, link, or path may be wired, as shown by links 116/126, wireless, as shown by connection point 128, or may include a combination of wired and wireless mediums.

The network 150 can, for example, be the Internet. In some embodiments, the network 150 may be, or include, a local area network (LAN), a wide area network (WAN), a virtual private network (VPN), or any other means of electronic computer communication capable of transferring data between any of clients 112/114/122/124 and servers 132/134/142/144. The network 150, the datacenters 130/140, or any other element, or combination of elements, of the electronic computing and communication system 100 may include network hardware such as routers, switches, load balancers, other network devices, or combinations thereof. For example, each of datacenters 130/140 may include one or more load balancers for routing traffic from network 150 to various servers, such as servers 132/134/142/144.

Other implementations of the electronic computing and communication system may be used. For example, devices other than the clients 112/114/122/124 and servers 132/134/142/144 shown may be included in the electronic computing and communication system 100. In an implementation, one or more additional servers may operate as an electronic computing and communication system infrastructure control, from which servers, clients, or both, may be monitored, controlled, configured, or a combination thereof. For example, some or all of the techniques described herein may operate on the electronic computing and communication system servers.

In some embodiments, one or more of the elements of the electronic computing and communication system 100, such as the clients 112/114/122/124 or the servers 132/134/142/144, may be configured to store, manage, and provide one or more databases, tables, or other information sources, or a portion thereof, such as a configuration management database (CMDB), a management information base (MIB), or a combination thereof. A configuration management database may include records representing one or more entities, devices, or units of the electronic computing and communication system, such as the clients 112/114/122/124, the customers 110/120, the datacenters 130/140, the servers 132/134/142/144, the access point 128, the network 150, or any other element, portion of an element, or combination of elements of the electronic computing and communication system 100. The configuration management database may include information describing the configuration, the role, or both, of an element of the electronic computing and communication system 100. In some embodiments, a management information base may include one or more databases listing characteristics of the elements of the electronic computing and communication system 100. In some embodiments, an object identifier (OID) may represent object identifiers of objects or elements in the MIB.

In some embodiments, the techniques and methods described herein, portions thereof, or combinations thereof, may be implemented on a single device, such as a single server, or a combination of devices, such as a combination of clients 112/114/122/124 and servers 132/134/142/144.

Figure 2:
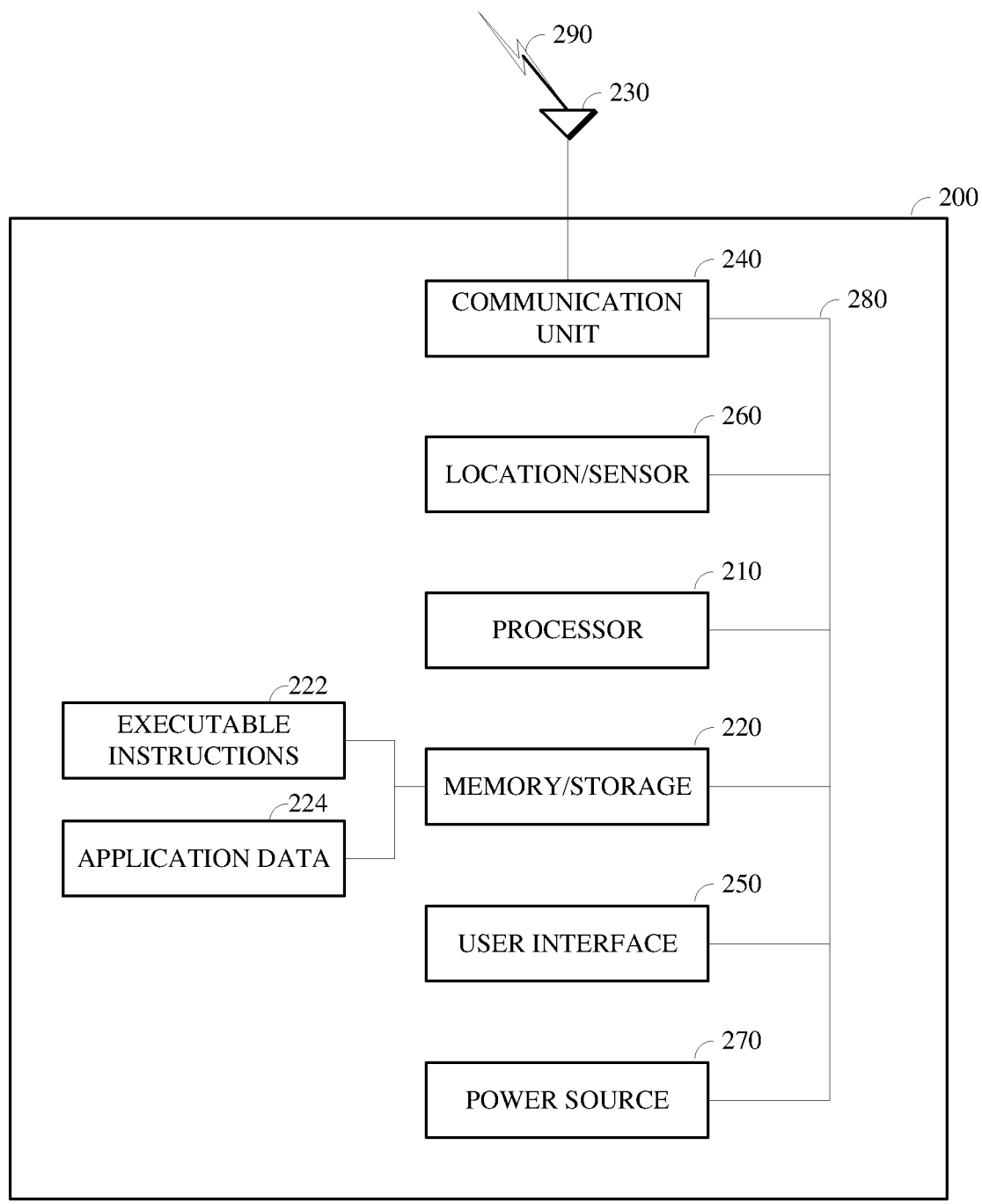
FIG. 2 is a block diagram of an example internal configuration of a computing device, such as a computing device of the computing system as shown in FIG. 1.

FIG. 2 is a block diagram of an example internal configuration of a computing device 200, such as a client 112/114/122/124 or a server 132/134/142/144 of the electronic computing and communication system 100 shown in FIG. 1. As previously described, a client or server may be a computing system including multiple computing devices, or a single computing device, such as a mobile phone, a tablet computer, a laptop computer, a notebook computer, a desktop computer, a server computer, or the like.

A computing device 200 can include components or units, such as a processor 210, memory 220, a network communication unit 230, a network communication interface 240, a user interface 250, a sensor unit 260, a power source 270, a bus 280, or a combination thereof.

The processor 210 can be a central processing unit (CPU), such as a microprocessor, and can include single or multiple processors, each having single or multiple processing cores. The processor 210 can include single or multiple processors each having single or multiple processing cores. Alternatively, the processor 210 can include another type of device, or multiple devices, capable of manipulating or processing information now-existing or hereafter developed. For example, the processor 210 may include multiple processors interconnected in any manner, including hardwired or networked, including wirelessly networked. In some embodiments, the operations of the processor 210 can be distributed across multiple physical devices or units that can be coupled directly or across a local area or other network.

In some embodiments, the memory 220 may include volatile memory, non-volatile memory, or a combination thereof. For example, the memory 220 may include volatile memory, such as one or more DRAM modules such as DDR SDRAM, and non-volatile memory, such as a disk drive, a solid state drive, flash memory, Phase-Change Memory (PCM), or any form of non-volatile memory capable of persistent electronic information storage, such as in the absence of an active power supply. In some embodiments, the memory 220 can include another type of device, or multiple devices, capable of storing data or instructions for processing by the processor 210, now-existing or hereafter developed. The processor 210 may access and manipulate data in the memory 220 via the bus 280.

The memory 220 can include executable instructions 222, data, such as application data 224, or a combination thereof, for immediate access by the processor 210. The executable instructions 222 can include, for example, an operating system and one or more application programs, which may be loaded or copied, in whole or in part, from non-volatile memory to volatile memory to be executed by the processor 210. The executable instructions 222 may be organized into programmable modules or algorithms, functional programs, codes, code segments, or combinations thereof, to perform various functions described herein. The operating system can be, for example, Microsoft Windows®, Mac OS X®, Linux®, or an operating system for a small device, such as a smart phone or tablet device, or a large device, such as a mainframe computer. Functional programs can include, for example, a web browser, a web server, a database server, or a combination thereof. The application data 224 can include, for example, user files, database catalogs, and configuration information. The memory 220 may include executable instructions 222, application data 224, or a combination thereof for implementing the techniques described herein. The memory 220 may comprise one or multiple devices and may utilize one or more types of storage, such as solid state or magnetic.

The network communication unit 240 can be coupled to the processor 210 via the bus 280. In some embodiments, network communication unit 240 can comprise one or more transceivers. The network communication unit 240 can, for example, provide a connection or link to a network, such as the network 150 shown in FIG. 1, via the network communication interface 230, which may be a wired network interface, such as Ethernet, or a wireless network interface (as shown). For example, the computing device 200 may communicate with other devices via the network communication unit 240 and the network interface 230 using one or more network protocols, such as Ethernet, TCP/IP, power line communication (PLC), WiFi, infrared, GPRS/GSM, CDMA, or the like.

A user interface 250 can include a display, a positional input device, such as a mouse, touchpad, touchscreen, or the like, a keyboard, or any other human and machine interface devices. The user interface 250 can be coupled to the processor 210 via the bus 280. Other interface devices that permit a user to program or otherwise use the computing device 200 can be provided in addition to or as an alternative to a display. In some embodiments, the user interface 250 may include a display, which may be a liquid crystal display (LCD), a cathode-ray tube (CRT), a light emitting diode (LED) display, such as an OLED display, or the like.

Although a single sensor 260 is shown, a computing device 200 may contain any number of sensors and detectors 260, which may monitor the device 200 itself or the environment around the device 200. For example, a computing device 200 may contain a geospatial location identification unit 260, such as a global positioning system (GPS) location unit. In some embodiments, the power source 270 may be a battery, and the computing device 200 may operate independently of an external power distribution system. Any of the components of the computing device 200, such as the sensor 260 or the power source 270 may communicate with the processor 210 via the bus 280.

Other implementations of the internal architecture of clients and servers may be used. For example, a server may omit the location unit 260. The operations of the processor 210 can be distributed across multiple machines which can be coupled directly or across a local area or other network. The memory 220 can be distributed across multiple machines such as network-based memory or memory in multiple machines performing the operations of clients or servers. Although depicted here as a single bus, the bus 280 can be composed of multiple buses, that may be connected to each other through various bridges, controllers, and/or adapters.

Figure 3:
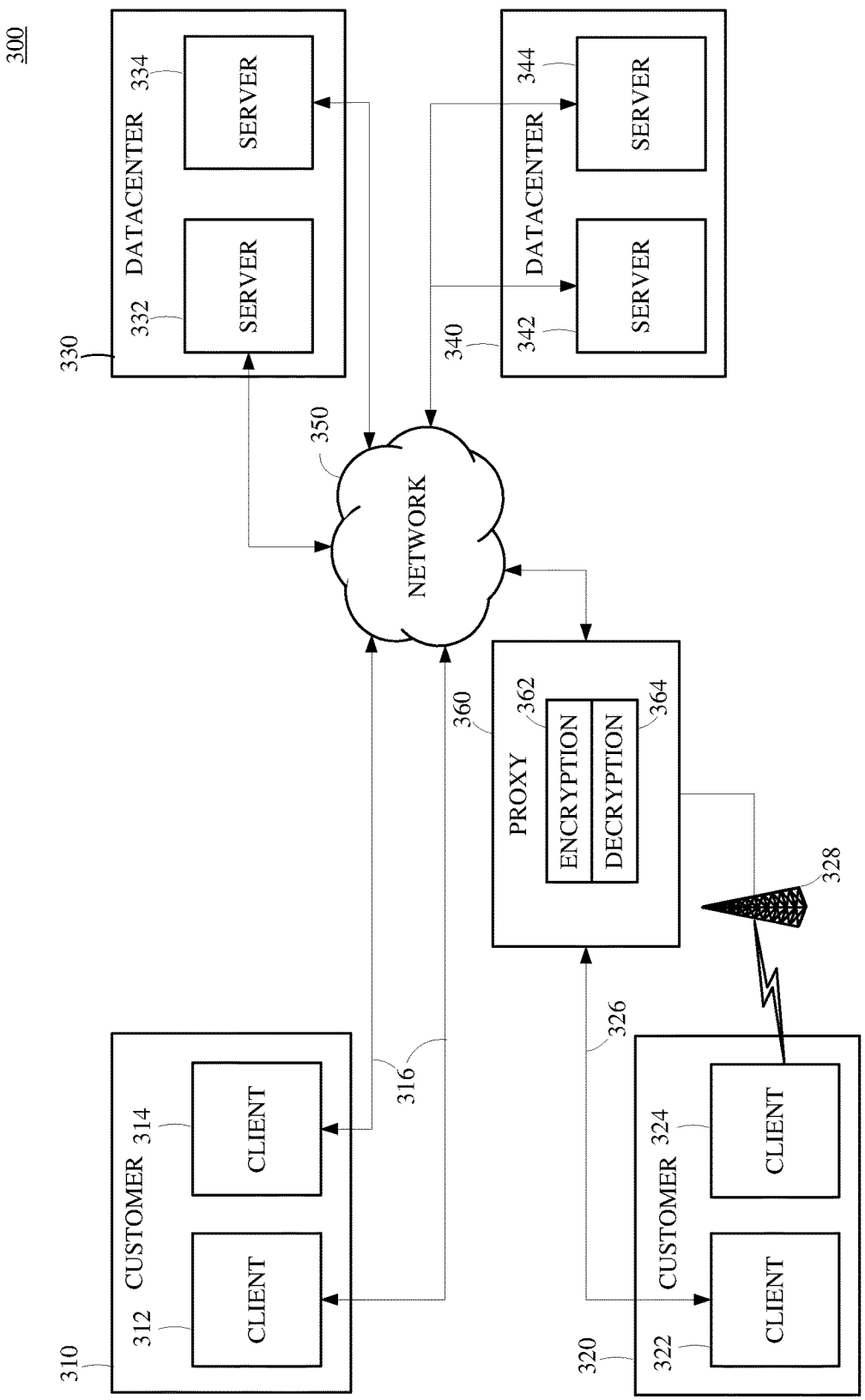
FIG. 3 is a block diagram of an example of an electronic computing and communication system for selective encryption in accordance with this disclosure.

FIG. 3 is a block diagram of an example of an electronic computing and communication system for selective encryption in accordance with this disclosure. The electronic computing and communication system 300 may be similar to the electronic computing and communication system 100 shown in FIG. 1, except as described herein.

In some embodiments, the electronic computing and communication system 300 can include customers, such as customers 310 and 320. A customer may have clients, such as clients 312, 314 for customer 310 and clients 322, 324 for customer 320. The electronic computing and communication system 300 can include datacenters 330/340, which may include servers 332/334/342/344. Clients 312/314/322/324 and servers 332/13/342/344 may be configured to connect to a network 350.

In some embodiments, the electronic computing and communication system 300 may include a proxy 360, or gateway. The proxy 360 may be a device operating on the communication path or paths between internal elements, such the clients 322/324, operating within the customer network or domain 320, and external elements, such as the servers 332/334/342/344, operating outside the customer system 320. In some embodiments, the communication path between internal elements and external elements may include one or more insecure portions, such as the Internet 350.

In some embodiments, the proxy 360 may be an edge encryption proxy, and may include an encryption unit 362, a decryption unit 364, or both. For example, the proxy 360 may be an edge encryption proxy and may intercept communications between internal elements, such as the clients 322/324, operating within the customer network or domain 320, and external elements, such as the servers 332/334/342/344, operating outside the customer system 320. For simplicity and clarity, communications sent from internal elements, such the clients 322/324, to external elements, such as the servers 332/334/342/344, received or intercepted by the proxy 360 may be referred to herein as outbound data, outbound communications, outbound messages, or outbound information, and communications sent from external elements, such as the servers 332/334/342/344, to internal elements, such the clients 322/324, received or intercepted by the proxy 360 may be referred to herein as inbound data, inbound communications, inbound messages, or inbound information. In some embodiments, the proxy 360 may intercept, relay, forward, or route inbound communications, outbound communications, or both. In some embodiments, the proxy 360 may be transparent to the client 322/324.

Although shown as part of the customer domain in FIG. 3, in some embodiments, a proxy device may be a member of, or operate within a network or domain other than the customer domain. For example, a client device, which may be operating within the customer domain or another domain, may transmit outbound data to a server, which may be outside the customer domain or within the customer domain, and the request may be redirected, such as via a domain name system (DNS) redirect, to a proxy device, which may be operating outside the customer domain. In some embodiments, the proxy device may validate the client device, such as via a log-in process.

In some embodiments, the proxy 360 may intercept outbound messages sent by internal elements, and may send corresponding communications to external elements on behalf of the internal elements. For example, a client, such the clients 322/324, may send a message to a server, such as one of the servers 332/334/342/344, the proxy 360 may intercept the outbound message, determine that the outbound message include sensitive information, generate an encrypted, or partially encrypted, message corresponding to the outbound message, and send the encrypted, or partially encrypted, data to the server on behalf of the client. In some embodiments, the outbound communication may include an indication of a recipient, such as the server.

In some embodiments, the proxy 360 may intercept inbound messages sent by external elements, and may send corresponding communications to internal elements. For example, a server, such as one of the servers 332/334/342/344, may send a message to a client, such the clients 322/324, the proxy 360 may intercept the inbound message, determine that the inbound message include encrypted information, generate a decrypted message corresponding to the inbound message, and send the decrypted data to the client.

For simplicity and clarity, outbound messages received at, or intercepted by, the proxy 360 are described herein as including unencrypted data, such as clear text; however, the outbound messages may include encrypted data. Similarly, data sent to internal elements, such as the clients 322/324 by the proxy 360 are described herein as decrypted data; however, the decrypted data may include data encrypted using a technique other than selective encryption.

For example, a client 322/324 may encrypt data using a first encryption key, to generate first encrypted data. The client 322/324 may send outbound data, including the first encrypted data, to one of the servers 332/334/342/344. The proxy 360 may intercept and encrypt the outbound data, or a portion thereof, which may include the first encrypted data, using a second encryption key, to generate second encrypted data. The proxy 360 may send the output, which may include the second encrypted data, to the server 332/334/342/344. Subsequently, the server 332/334/342/344 may send inbound data, which may include the second encrypted data, to the client 322/324. The proxy 360 may intercept the inbound data and may decrypt the second encrypted data to generate first decrypted data, which may include the first encrypted data. The proxy 360 may send the first decrypted data, or decrypted portion, to the client 322/324. The client 322/324 may receive the first decrypted data, including the first encrypted data, and may decrypt the first encrypted data to generate second decrypted data.

In some embodiments, the proxy 360 may identify elements of an outbound data stream for encryption. In some embodiments, identifying the elements for encryption may include parsing outbound messages to identify discrete elements and determining whether the respective elements include sensitive information to be encrypted. In some embodiments, the element parsing and sensitivity determination may be performed based on one or more defined rules.

In some embodiments, the rules or logic to identify sensitive elements in a message may be statically incorporated, or hard-coded, into the programming of the page or application that submitted the message. However, hard-coded logic may lack flexibility, may include redundancies, and may be inefficient to maintain. In some embodiments, selective encryption may reduce or eliminate the deficiencies of hard-coded logic by generating and storing the logic for element parsing and sensitivity determination independently of the programming of the page or application submitting messages for partial encryption.

Figure 4:
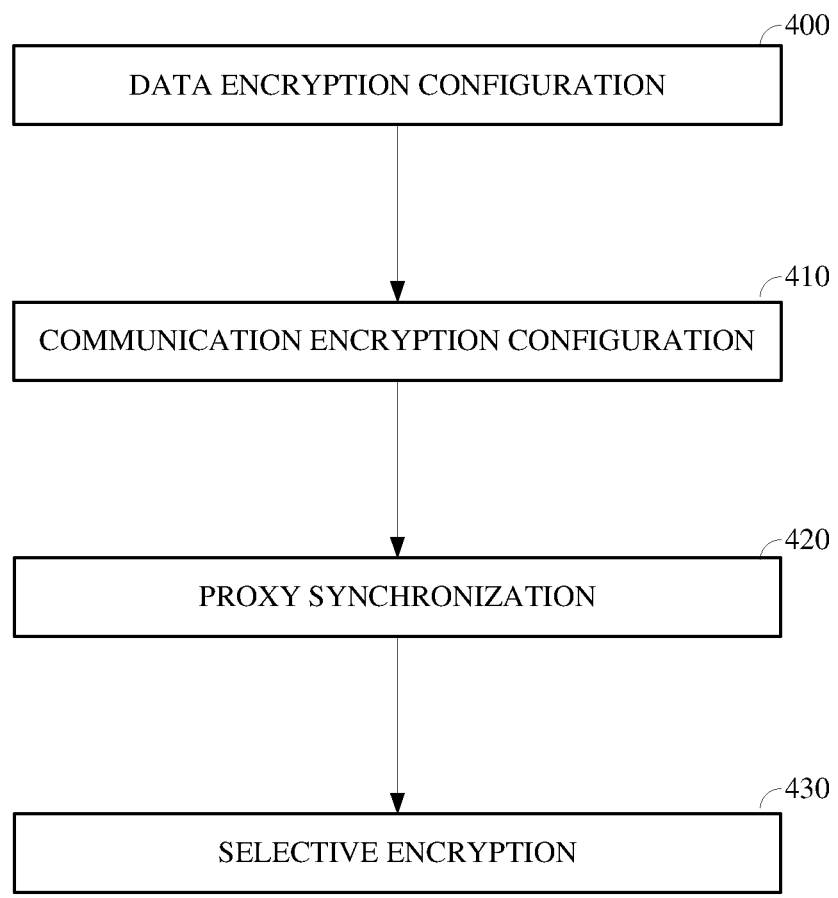
FIG. 4 is a flowchart diagram of an example of selective encryption configuration in accordance with this disclosure.

FIG. 4 is a flowchart diagram of an example of selective encryption configuration in accordance with this disclosure. In some embodiments, selective encryption, or elements thereof, may be implemented on a device, such as the proxy 360 shown in FIG. 3, which may be an edge encryption proxy, a server 332/334/342/344 shown in FIG. 3, a client 322/324 as shown in FIG. 3, or a combination thereof. In some embodiments, selective encryption configuration may include data encryption configuration at 400, communication encryption configuration at 410, proxy synchronization at 420, selective encryption at 430, or a combination thereof.

In some embodiments, data encryption for selective encryption may be configured at 400. In some embodiments, configuring data encryption for selective encryption, or elements thereof, may be implemented on a device, such as a server 332/334/342/344 shown in FIG. 3. In some embodiments, data encryption configuration for selective encryption may include identifying or configuring one or more data storage elements or structures for storing sensitive information. For example, a device, or group of devices, such as datacenter 330/340 or servers 332/334/342/344 as shown in FIG. 3, may include a defined data store which may have a defined data storage structure, such as a databased including tables, fields, and relationships among tables and fields, and data encryption configuration at 400 may include identifying or configuring elements of the data storage, such as tables or fields for storing sensitive information. In some embodiments, a device, or group of devices, may store multiple data storage structures, such as multiple databases.

Figure 5:
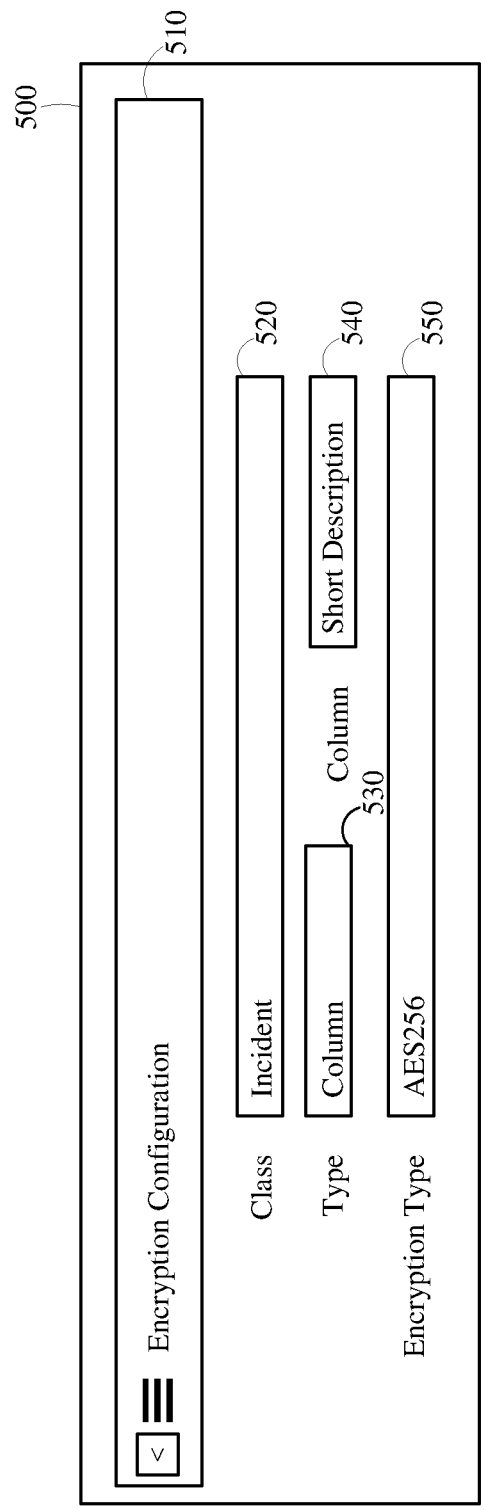
FIG. 5 is a diagram of an example of a user interface for data encryption configuration for selective encryption in accordance with this disclosure.
Figure 6:
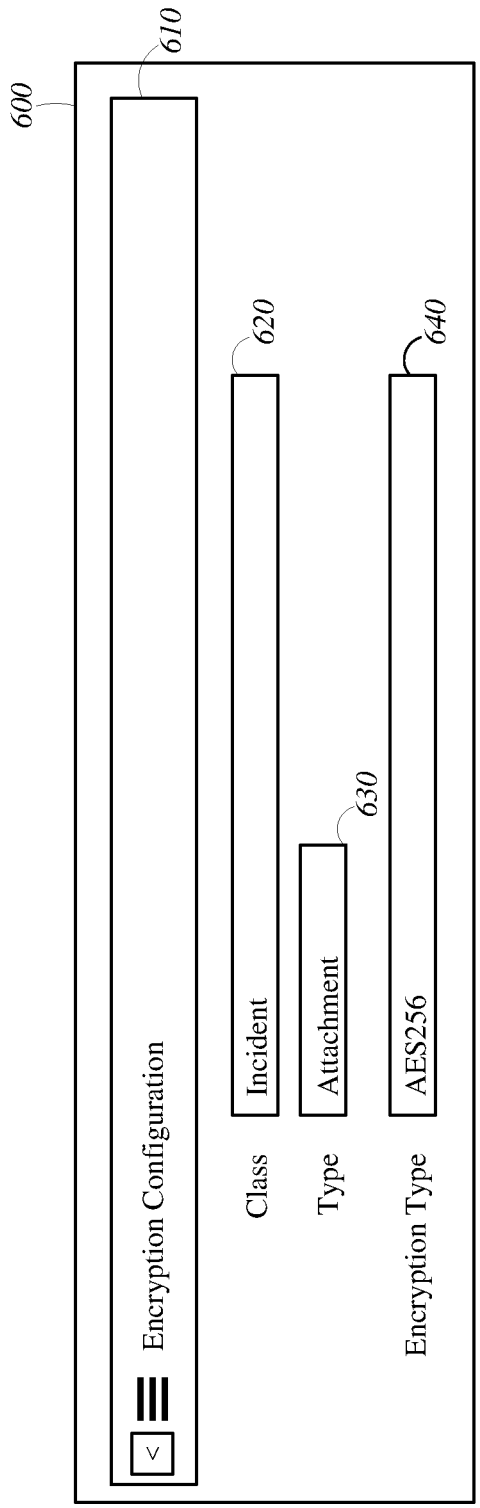
FIG. 6 is another diagram of an example of a user interface for data encryption configuration for selective encryption in accordance with this disclosure.

In some embodiments, data encryption configuration for selective encryption may include identifying a data store, such as a database, an element of the data store, such as a class, a table, a field, or both, and identifying encryption information for the element. In some embodiments, identifying an element may include identifying a type of element, such as column or field element, or attachment, a name or description of the element, or a combination thereof. An example of a user interface for selective encryption configuration is shown in FIGS. 5-6.

In some embodiments, data encryption configuration for selective encryption at 400 may include storing data encryption configuration information for selective encryption, such as in a database, or other information storage unit, such as in a selective encryption configuration table, which may be stored at a device, such as a server 332/334/342/344 shown in FIG. 3, which may be external to a customer network or domain. Table 1, below, shows an example of a portion of a selective encryption configuration table.

TABLE 1

| Field | Type | Description |
|---|---|---|
| class_name | Table Name | The table name |
| column | Field Name | The column name |
| encryption_type | Choice | The cipher to use to encrypt and decrypt |
| type | Choice | Either Column or Attachment |

In some embodiments, data encryption configuration for selective encryption at 400 may be independent of communication encryption configuration for selective encryption at 410. For example, data encryption configuration for selective encryption at 400 may be performed prior to, subsequent to, or prior to and subsequent to, communication encryption configuration for selective encryption at 410.

In some embodiments, communication encryption for selective encryption may be configured at 410. In some embodiments, communication encryption configuration for selective encryption may include identifying or configuring one or more communication encryption rules, or portions thereof, for evaluating communication elements for selective encryption. For example, a device, such as the proxy 360 shown in FIG. 3, which may be an edge encryption proxy, and which may be in a customer network or domain, such as the customer domain 320 as shown in FIG. 3, may identify or configure communication encryption rule for selective encryption s, such as in response to user input.

Figure 7:
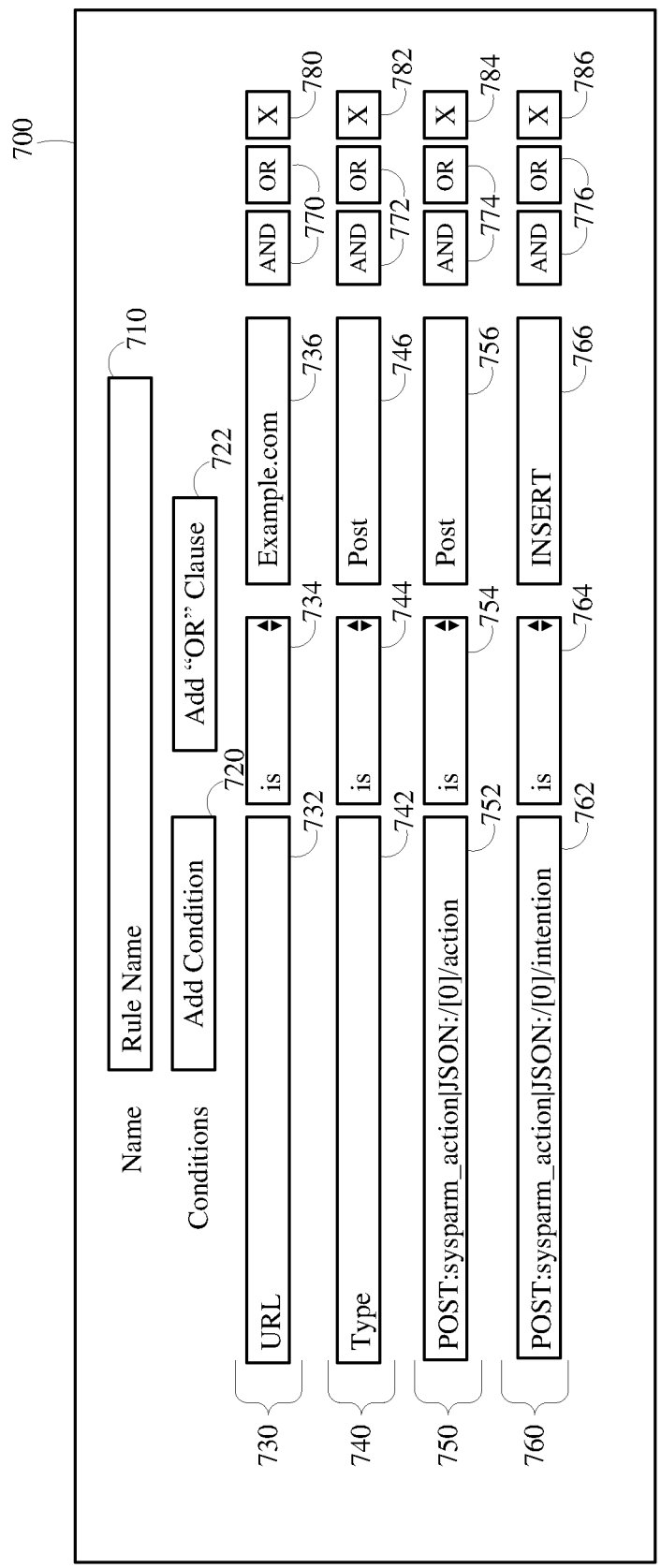
FIG. 7 is a diagram of an example of a user interface for rule condition configuration for selective encryption in accordance with this disclosure.
Figure 8:
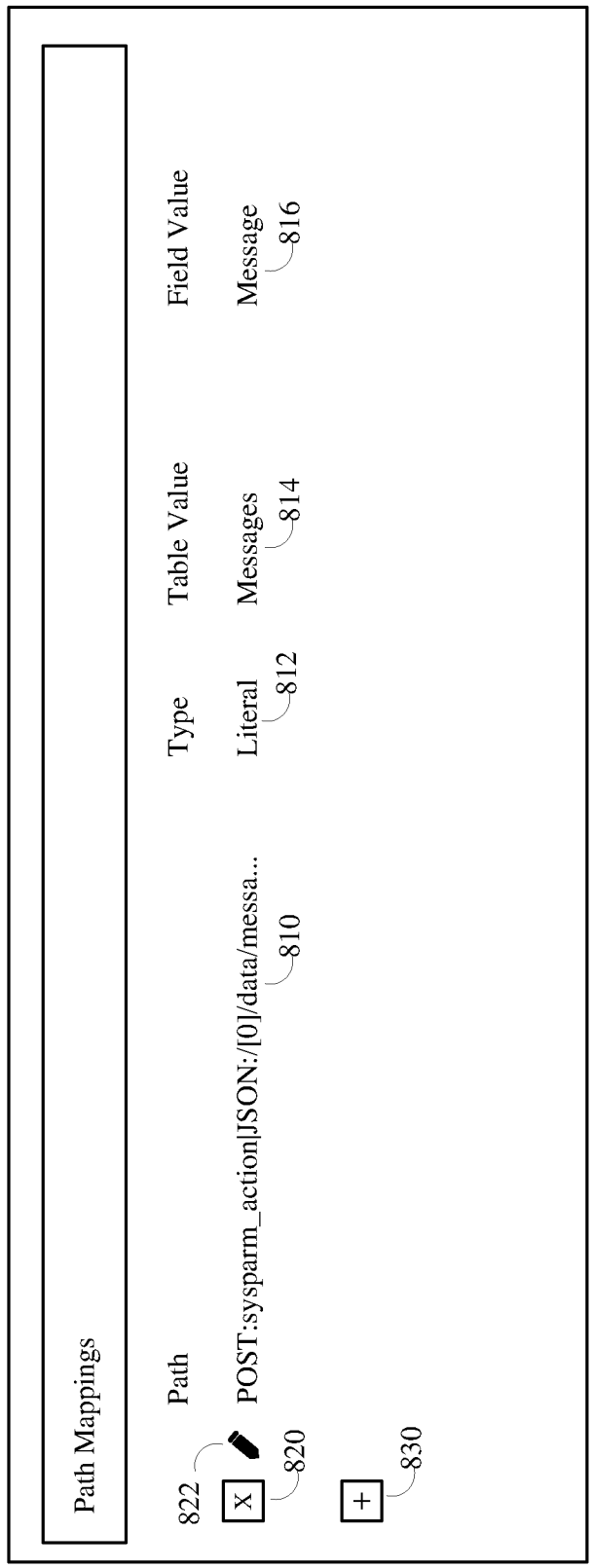
FIG. 8 is a diagram of an example of a user interface for content mapping configuration for selective encryption in accordance with this disclosure.

Examples of communication encryption rule configuration for selective encryption are shown in FIGS. 7-8. In some embodiments, communication encryption configuration for selective encryption at 410 may include storing communication encryption configuration rules for selective encryption, such as in a database, or other information storage unit.

In some embodiments, data encryption configuration information for selective encryption may be synchronized at 420. In some embodiments, a device, such as the proxy 360 shown in FIG. 3, which may be an edge encryption proxy, and which may be in a customer network or domain, such as the customer domain 320 as shown in FIG. 3, may receive data encryption configuration information for selective encryption, such as the data encryption configuration information for selective encryption generated at 400. In some embodiments, the proxy may receive the data encryption configuration information for selective encryption in response to a request. For example, the proxy may request the data encryption configuration information for selective encryption from another device, such as a server 332/334/342/344 as shown in FIG. 3. In some embodiments, the proxy may request the data encryption configuration information for selective encryption periodically, in response to user input, or in response to an event.

In some embodiments, the proxy may receive differential data encryption configuration information for selective encryption. For example, the proxy may receive data encryption configuration information for selective encryption from a server, the data encryption configuration information for selective encryption stored at the server may be updated, subsequently the proxy may request the data encryption configuration information for selective encryption, and, in response to the subsequent request, the proxy may receive differential data encryption configuration information for selective encryption, which may indicate a difference between the data encryption configuration information for selective encryption received prior to the subsequent request and the current data encryption configuration information for selective encryption. In some embodiments, in response to receiving a request for data encryption configuration information for selective encryption, the server may determine whether the data encryption configuration information for selective encryption has changed. In some embodiments, the data encryption configuration information for selective encryption may not have changed and the server may omit sending the data encryption configuration information for selective encryption. In some embodiments, the data encryption configuration information for selective encryption may have changed and the server may send differential data encryption configuration information for selective encryption, or complete data encryption configuration information for selective encryption. In some embodiments, the proxy may store the data encryption configuration information for selective encryption, such as in a memory of the proxy.

Figure 9:
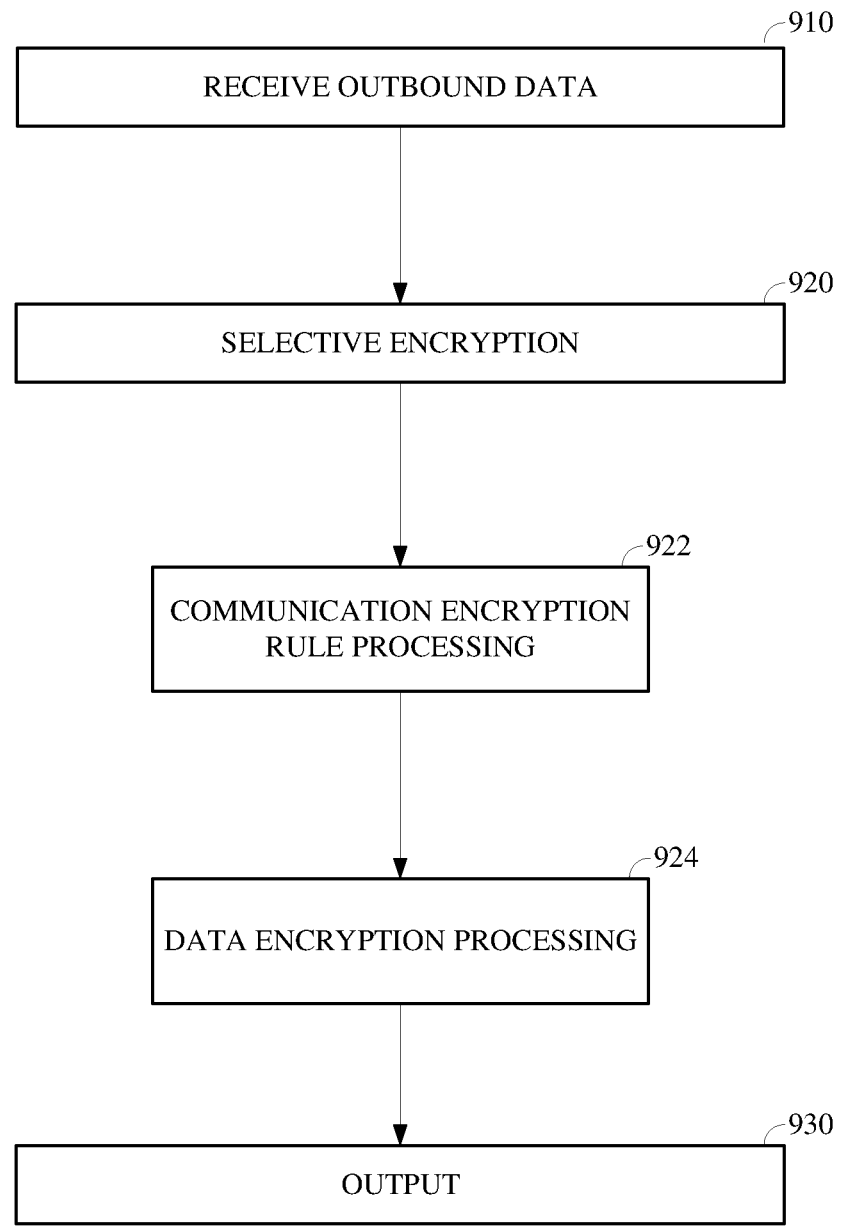
FIG. 9 is a flowchart diagram of an example of selective encryption in accordance with this disclosure.

In some embodiments, selective encryption may be performed at 430. In some embodiments, selective encryption may include receiving or intercepting an outbound communication, evaluating the outbound communication to identify candidate sensitive information elements based on the communication encryption configuration information generated at 410, evaluating the candidate sensitive information elements based on the data encryption configuration information identified at 400 and synchronized at 420 to identify sensitive information elements, and replacing the content of sensitive information elements with encrypted content. An example, of selective encryption is shown in FIG. 9.

FIG. 5 is a diagram of an example of a user interface for data encryption configuration for selective encryption, such as the data encryption configuration for selective encryption shown at 400 in FIG. 4, in accordance with this disclosure. In some embodiments, data encryption configuration information for selective encryption may be generated or configured via a user interface, such as the user interface 500 shown in FIG. 5.

In some embodiments, the user interface 500 may include a header portion 510, which may include a description of the user interface, one or more controls for the user interface, or a combination thereof.

In some embodiments, data encryption configuration for selective encryption may include configuring class information for a data encryption configuration information element for selective encryption. In some embodiments, the user interface 500 may include a class input 520 for indicating a class for a data encryption configuration information element for selective encryption. The class value may indicate, for example, a name of a database table.

In some embodiments, data encryption configuration for selective encryption may include configuring type information for a data encryption configuration information element for selective encryption. In some embodiments, the user interface 500 may include a type input 530 for indicating type information for a data encryption configuration information element for selective encryption. The type information may indicate, for example, whether the data encryption configuration information element for selective encryption is associated with a database field, such as a field in the table indicated in the class information as shown in FIG. 5, or an attachment as shown in FIG. 6.

In some embodiments, data encryption configuration for selective encryption may include configuring column or field identification information for a data encryption configuration information element for selective encryption. In some embodiments, the type information may indicate that the type for the data encryption configuration information element for selective encryption is column, and the user interface 500 may include a column input 540 for indicating column information for the data encryption configuration information element for selective encryption. In some embodiments, the column information may indicate a column or field in a table as indicated in the class information. For example, the column value may be a name of a column or field. In some embodiments, candidate column values may be populated for the column input 540 based on the value of the class input 520.

In some embodiments, data encryption configuration for selective encryption may include configuring encryption type identification information for a data encryption configuration information element for selective encryption. In some embodiments, the user interface 500 may include an encryption type input 540 for indicating an encryption type. The encryption type value may indicate a type of encryption for encrypting the data encryption configuration information element for selective encryption.

In some embodiments, data encryption configuration information for selective encryption, such as data encryption configuration information for selective encryption generated or configured via the user interface shown in FIG. 5 may be stored in a database, or other information storage unit, such as in the selective encryption configuration table shown in Table 1. In some embodiments, the selective encryption configuration table may be stored in a database at a server and the edge proxy may request, such as periodically, data encryption configuration information, such as information indicating any changes to the selective encryption configuration table, from the server, and may store data encryption configuration information at the edge proxy, such as in dynamic memory, as shown at 420 in FIG. 4.

FIG. 6 is another diagram of an example of a user interface for data encryption configuration for selective encryption, such as the data encryption configuration for selective encryption shown at 400 in FIG. 4, in accordance with this disclosure. In some embodiments, data encryption configuration information for selective encryption may be generated or configured via a user interface, such as the user interface 600 shown in FIG. 6. In some embodiments, the user interface for data encryption configuration for selective encryption 600 shown in FIG. 6 may be similar to the user interface for data encryption configuration for selective encryption 500 shown in FIG. 5, except as described herein.

In some embodiments, the user interface 600 may include a header portion 610, which may include a description of the user interface, one or more controls for the user interface, or a combination thereof.

In some embodiments, data encryption configuration for selective encryption may include configuring class information for a data encryption configuration information element for selective encryption. In some embodiments, the user interface 600 may include a class input 620 for indicating a class for a data encryption configuration information element for selective encryption. The class value may indicate, for example, a name of a database table.

In some embodiments, data encryption configuration for selective encryption may include configuring type information for a data encryption configuration information element for selective encryption. In some embodiments, the user interface 600 may include a type input 630 for indicating type information for a data encryption configuration information element for selective encryption. The type information may indicate, for example, whether the data encryption configuration information element for selective encryption is associated with a database field, such as a field in the table indicated in the class information as shown in FIG. 5, or an attachment as shown in FIG. 6.

In some embodiments, the type information may indicate that the type for the data encryption configuration information element for selective encryption is attachment.

In some embodiments, data encryption configuration for selective encryption may include configuring encryption type identification information for a data encryption configuration information element for selective encryption. In some embodiments, the user interface 600 may include an encryption type input 640 for indicating an encryption type. The encryption type value may indicate a type of encryption for encrypting the data encryption configuration information element for selective encryption.

In some embodiments, data encryption configuration information for selective encryption, such as data encryption configuration information for selective encryption generated or configured via the user interface shown in FIG. 6 may be stored in a database, or other information storage unit, such as in the selective encryption configuration table shown in Table 1. In some embodiments, the selective encryption configuration table may be stored in a database at a server and the edge proxy may request, such as periodically, data encryption configuration information, such as information indicating any changes to the selective encryption configuration table, from the server, and may store data encryption configuration information at the edge proxy, such as in dynamic memory, as shown at 420 in FIG. 4.

FIGS. 7-8 show diagrams of examples of a user interface for communication encryption configuration for selective encryption in accordance with this disclosure. In some embodiments, communication encryption configuration for selective encryption may include configuring one or more communication encryption rules for identifying elements of outbound communications as candidate elements for encryption.

In some embodiments, a communication encryption rule for selective encryption may include one or more rule parts, such as rule conditions, content mappings, or a combination thereof. For example, a communication encryption rule for selective encryption may include a series of rule conditions and a collection of content mappings. In some embodiments, the rule conditions, the content mappings, or both, may be implemented as rule paths.

In some embodiments, one or more communication encryption rules for selective encryption may be generated in response to input, such as user input. In some embodiments, one or more communication encryption rules may be generated or configured using a declarative encryption rules engine, which may include generating rules using a human-machine, or user, interface as shown in FIGS. 7-8. For example, rule conditions may be configured in response to user input received via a user interface, such as the user interface 700 shown in FIG. 7, and content mappings may be configured in response to user input received via a user interface 800 shown in FIG. 8.

Although not shown separately in FIGS. 7-8, in some embodiments, one or more portions of a communication encryption rule may be generated, defined, or modified, using a scripting or programming language, such as JavaScript or a domain specific language.

For example, an example of a rule condition generated using a scripting language may be expressed as follows:

```
function FormPostCondition(request) {
// Update and Save UI actions on the form
if (request.postParams.sys_target) { return true; }
return false;
}.
```

In another example, an example of a content mapping generated using a scripting language may be expressed as follows:

```
function FormPostAction(request) {
var tableName = request.postParams.sys_target;
for (var paramName in request.postParams) {
    var fieldName = paramName.replace("sys_display.original.", "");
    fieldName = fieldName.replace("sys_original.", "");
    fieldName = fieldName.replace("sys_display.","");
    fieldName = fieldName.replace(tableName + ".", "");
    request.postParams[paramName].valueFor(tableName, fieldName);
    }
}.
```

In some embodiments, the scripting language may be used to implement encryption.

FIG. 7 is a diagram of an example of a user interface 700 for rule condition configuration for selective encryption in accordance with this disclosure. In some embodiments, communication encryption rule for selective encryption configuration, such as the communication encryption rule for selective encryption configuration shown at 410 in FIG. 4, may include configuring a name, title, or description, for a communication encryption rule for selective encryption. In some embodiments, the user interface 700 for communication encryption rule for selective encryption configuration may include a rule name input element 710.

In some embodiments, communication encryption rule for selective encryption configuration, such as the communication encryption rule for selective encryption configuration shown at 410 in FIG. 4, may include configuring one or more rule conditions 730/740/750/760. In some embodiments, one or more conditions may be included in a condition group. For example, a first group may include the conditions "URL is Example.com" 730 and "Type is Post" 740 (as shown), and a second group may include a condition "URL contains Example.com" and a condition "Type is Get" (not shown). In some embodiments, the user interface 700 for communication encryption rule for selective encryption configuration may include an add condition input element 720, and a rule condition may be added to the rule in response to user input selecting the add condition input element 720. In some embodiments, the user interface 700 for communication encryption rule for selective encryption configuration may include an add condition group input element 722, and a rule condition group may be added to the rule in response to user input selecting the add condition group input element 722. Four rule conditions, in one rule condition group, are shown in FIG. 7 for simplicity and clarity, however, a communication encryption rule for selective encryption may include any number of rule conditions, condition groups, or combinations thereof.

In some embodiments, a rule condition 730/740/750/760 may indicate one or more elements that correspond to one or more information elements that describe outbound communications. In some embodiments, a rule condition may include an operand reference, a relational operator, a target value, or a combination thereof. In some embodiments, a rule condition 730/740/750/760 may be accompanied by, or associated with, a logical operator. In some embodiments, the user interface 700 for communication encryption rule for selective encryption configuration may include a portion for each rule condition 730/740/750/760. The user interface portion for a rule condition 730/740/750/760 may include an operand reference input 732/742/752/762, a relational operator input 734/744/754/764, a target value input 736/746/756/766, or a combination thereof. In some embodiments, the user interface portion for a rule condition 730/740/750/760 may include a logical operator control 770/772/774/776, a removal control 780/782/784/786, or a combination thereof.

In some embodiments, an operand reference 732/742/752/762 may indicate a name or description of a portion of respective outbound communications to evaluate for the rule condition, within a relevant syntax or protocol. For example, some outbound communications may be HTTP protocol communications; the HTTP protocol may describe syntax elements, such as type and URL; and an operand reference 732/742/752/762 may indicate that the portion of respective outbound communications to evaluate corresponds with the type syntax element or the URL syntax element. In some embodiments, an operand reference 732/742/752/762 may indicate a portion of a syntax element, or a group of syntax elements. For example, a URL syntax element may include a top-level domain syntax element, a domain syntax element, a subdomain syntax element, or other syntax elements, and an operand reference 732/742/752/762 may indicate a top-level domain, or a combination of a top-level domain and a domain. In some embodiments, an operand reference 732/742/752/762 may be identified from a defined set of operand references, which may include operand references corresponding to one or more protocols. In some embodiments, the operand reference input 732/742/752/762 may be a text input. For example, the operand references may include "URL" (as shown), or "URL Path", "Type" (as shown), or "Request Method", "sysparm_processor", "sysparm_type", or any other identifiable portion of an outbound communication.

In some embodiments, a communication encryption rule may include rule conditions 730/740/750/760 corresponding to multiple protocols. For example, the top two rule conditions 730/740 shown in FIG. 7 may correspond with the HTTP protocol, and the bottom two rule conditions 750/760 shown in FIG. 7 may correspond with the JSON protocol.

In some embodiments, selective encryption, such as the selective encryption shown at 440 in FIG. 4, may include evaluating an outbound communication based on communication encryption rules, which may include evaluating the outbound communication based on rule conditions, which may include identifying an operand reference for the rule condition, and parsing, interpreting, searching, or otherwise inspecting the outbound communication to identify a portion of the outbound communication corresponding to the syntactical element indicated by the operand reference to identify a corresponding value. In some embodiments, the edge encryption proxy may evaluate an outbound communication based on communication encryption rules to, for example, identify fields in a request header, parameters in a query string, parameters in a web form, or any other identifiable portion of an outbound communication.

For example, an outbound communication may be an HTTP protocol communication, the HTTP protocol may describe a message, or request, type syntax element, the outbound communication may include the value "Post" as the value of the syntax element request type; an edge encryption proxy may intercept the outbound communication and may perform selective encryption, which may include evaluating the outbound communication based on communication encryption rules, which may include a communication encryption rule, which may include a rule condition, which may include an operand reference, which may be "Type", as shown at 742, which may describe the request type syntax element of the HTTP protocol, the edge encryption proxy may evaluate, or otherwise inspect the outbound communication to identify the value of the portion of the outbound communication corresponding to the request type, and may identify the value "Post".

In some embodiments, a relational operator 734/744/754/764 may indicate an evaluation metric or relationship type between the value of the portion of the outbound communication indicated by the operand reference 732/742/752/762 and the target value 736/746/756/766. Some examples of relational operators are "equals", "is" (as shown), "same as", "includes", "sounds like", "greater than", or "less than"; however, any relational operator may be used. In some embodiments, the relational operator 734/744/754/764 may be selected from a defined set of relational operators.

For example, an example of a rule condition including an equality relational operator, such as "equals", may be expressed as the following:
POST:syspam_xml|XML:/outer/inner="example".

Another example, an example of a rule condition including an equality relational operator, such as "same as", may be expressed as the following:
POST: syspam_xml|XML:/outer/innerSAMEASPOST: syspam_json:JSON:/example.

In some embodiments, a target value 736/746/756/766 may indicate a defined, target, or matching value for evaluating the portion of the outbound communication indicated by the operand reference 732/742/752/762. For example, an outbound communication may be an HTTP protocol communication, the HTTP protocol may describe a message, or request, type syntax element, the outbound communication may include the value "Post" as the value of the syntax element request type; an edge encryption proxy may intercept the outbound communication and may perform selective encryption, which may include evaluating the outbound communication based on communication encryption rules, which may include a communication encryption rule, which may include a rule condition, which may include an operand reference, which may be "Type", as shown at 742, the relational operator "is", as shown at 744, and the target value "Post", as shown at 746; the edge encryption proxy may evaluate, or otherwise inspect the outbound communication to identify the value of the portion of the outbound communication corresponding to the request type, may identify the value "Post", may evaluate whether the value "Post" has the relationship "is" with the target value "Post", and may determine that the rule condition matches on the outbound communication. In another example, an outbound communication may be an HTTP protocol communication, the HTTP protocol may describe a message, or request, type syntax element, the outbound communication may include the value "Get" as the value of the syntax element request type; an edge encryption proxy may intercept the outbound communication and may perform selective encryption, which may include evaluating the outbound communication based on communication encryption rules, which may include a communication encryption rule, which may include a rule condition, which may include an operand reference, which may be "Type", as shown at 742, the relational operator "is", as shown at 744, and the target value "Post", as shown at 746; the edge encryption proxy may evaluate, or otherwise inspect the outbound communication to identify the value of the portion of the outbound communication corresponding to the request type, may identify the value "Get", may evaluate whether the value "Get" has the relationship "is" with the target value "Post", and may determine that the rule condition does not match on the outbound communication.

In some embodiments, a communication encryption rule may include multiple rule conditions 730/740/750/760 and a logical operator 770/772/774/776, such as "and", "or", or any other logical operator, may indicate a relationship between the respective result of evaluating the respective rule conditions 730/740/750/760. Although two logical operators, "and" and "or", are shown in FIG. 7, for each rule condition 730/740/750/760, in some embodiments, any number of logical operators may describe a relationship between rule condition evaluation results. In some embodiments, one or more condition groups may be accompanied by, or associated with, a logical operator, which may indicate a relationship between the respective result of evaluating the respective rule conditions of the respective condition groups.

In some embodiments, multiple rule conditions 730/740/750/760 may be evaluated in combination as a composed, or composite, rule condition. For example, a first rule condition may be expressed as "POST:syspam_parm1="example"", a second rule condition may be expressed as "POST: syspam_parm2="text"", and a composite rule condition combining the first rule condition and the second rule condition, related by the "and" logical operator, which may be expressed in a composite rule using the symbol "∧", may be expressed as follows:

POST: sysparm_parm1="example"˜POST:sysparm_parm2= "text".

For example, an outbound communication may be an HTTP protocol communication, the outbound communication may include the value "Post" as the value of a request type syntax element, and the value "example.com" as the value of a resource locator syntax element. An edge encryption proxy may intercept the outbound communication and may perform selective encryption, which may include evaluating the outbound communication based on communication encryption rules. The communication encryption rules may include a communication encryption rule. The communication encryption rule may include a first rule condition, which may include the operand reference "URL", as shown at 732, the relational operator "is", as shown at 734, and the target value "example.com", as shown at 736. The communication encryption rule may include the logical operator "and". The communication encryption rule may include a second rule condition, which may include the operand reference "Type", as shown at 742, the relational operator "is", as shown at 744, and the target value "Post", as shown at 746. The edge encryption proxy may evaluate, or otherwise inspect the outbound communication to identify the value of the portion of the outbound communication corresponding to the resource locator, may identify the value "example.com", may evaluate whether the value "example.com" has the relationship "is" with the target value "example.com", and may determine that the first rule condition is a matching rule condition. The edge encryption proxy may evaluate, or otherwise inspect the outbound communication to identify the value of the portion of the outbound communication corresponding to the request type, may identify the value "Post", may evaluate whether the value "Post" has the relationship "is" with the target value "Post", and may determine that the second rule condition is a matching rule condition. The edge encryption proxy may determine that a first matching condition and a second matching condition satisfies the logical operator "and", and may determine that the conditions portion of the communication encryption rule is satisfied, or matching.

In some embodiments, the user interface 700 for communication encryption rule for selective encryption configuration may include a remove control 780/782/784/786 associated with each rule condition 730/740/750/760. In some embodiments, a rule condition 730/740/750/760 may be removed from a communication encryption rule in response to input, such as user input, selecting the corresponding remove control 780/782/784/786.

FIG. 8 is a diagram of an example of a user interface 800 for content mapping configuration for selective encryption in accordance with this disclosure. In some embodiments, a communication encryption rule may include one or more content mappings. A content mapping may indicate a map or path to an element or elements in respective outbound communications that may be identified as candidate sensitive elements for selective encryption.

In some embodiments, a content mapping may include a path description 810, which may describe a path to, or location of, an element, or elements, of outbound data. In some embodiments, a path description 810 may be generated, or modified, in response to input, such as user input. For example, the user interface 800 for content mapping configuration for selective encryption may include a text input element at 810.

In some embodiments, a content mapping may include a content type indictor 812, such as "Literal" (as shown), "PathDependnet", or any other content type indicator. In some embodiments, a content type indictor 812 may be generated, or modified, in response to input, such as user input. For example, the user interface 800 for content mapping configuration for selective encryption may include a content type indictor selection input at 812.

In some embodiments, a content mapping may include a data storage mapping information, which may include a table identifier 814, a field identifier 816, or both. In some embodiments, a table identifier 814 may be generated, or modified, in response to input, such as user input. For example, the user interface 800 for content mapping configuration for selective encryption may include a table identifier selection input at 814. In some embodiments, a field identifier 816 may be generated, or modified, in response to input, such as user input. For example, the user interface 800 for content mapping configuration for selective encryption may include a field identifier selection input at 816.

In some embodiments, the available data storage mapping information 814/816 may be identified based on data storage configuration information, such as the data encryption configuration information for selective encryption synchronized as shown at 420 in FIG. 4.

In some embodiments, the user interface 800 for content mapping configuration for selective encryption may include a remove control 820, an edit control 822, or both, for a content mapping. Although one content mapping is shown, any number of content mappings may be used. In some embodiments, the user interface 800 for content mapping configuration for selective encryption may include an add content mapping control 830.

FIG. 9 is a flowchart diagram of an example of selective encryption in accordance with this disclosure. In some embodiments, selective encryption, or elements thereof, may be implemented on a device, such as the proxy 360 shown in FIG. 3, which may be an edge encryption proxy, a server 332/334/342/344 shown in FIG. 3, a client 322/324 as shown in FIG. 3, or a combination thereof. In some embodiments, selective encryption may include receiving outbound data at 910, selective encryption at 920, output at 930, or a combination thereof.

In some embodiments, outbound data may be received at 910. For example, a device, such as the proxy 360 shown in FIG. 3, which may be an edge encryption proxy, and which may be in a customer network or domain, such as the customer domain 320 as shown in FIG. 3, may receive or intercept outbound data from an internal element, such the clients 322/324 shown in FIG. 3. In some embodiments, the outbound data may be addressed to an external element, such as a server in a network or domain other than the customer network or domain (different network domain), and the proxy may intercept the outbound data.

In an example, the outbound data received at 910 may be expressed as follows:

POST http://example.com
sysparam_data=[{"action":"Post",
"args":{"_isModelCall":true,"intention":"INSERT"},
"data":{"message":"Example Sensitive Content"}}].

Example 1

In some embodiments, data may be selectively encrypted at 920. For example, the outbound data received at 910 may be selectively encrypted based on the data encryption configuration information for selective encryption configured as shown at 400 in FIG. 4, the communication encryption rules for selective encryption configured as shown at 410 in FIG. 4, or a combination thereof.

In some embodiments, the outbound communication received at 910 may include content using multiple protocols, and the edge encryption proxy, or the declarative encryption rules engine of the edge encryption proxy, may process or evaluate the outbound communication at 920 as a single document or object, which may include using rule paths, such as the rule paths corresponding to the rule conditions and content mappings generated as shown at 410 in FIG. 4, and in FIGS. 7-8, without parsing the outbound communication according to the respective protocols used in the outbound communication.

In some embodiments, selective encryption at 920 may include evaluating the outbound data received at 910 based on the communication encryption rules for selective encryption to identify one or more portions of the outbound data for selective encryption, and selectively encrypting the data identified for selective encryption based on the data encryption configuration information for selective encryption.

In some embodiments, selective encryption at 920 may include evaluating the outbound data received at 910 in a single pass. For example, one or more of the communication encryption rules may be evaluated concurrently. In some embodiments, selective encryption at 920 may include evaluating the outbound data received at 910 using a procedural approach including multiple passes of the content.

Although not shown separately in FIG. 4 or FIG. 9, in some embodiments, the edge encryption proxy may process one or more communication encryption rules into an efficient data structure for rule evaluation, such as one or more expression trees that represent the communication encryption rules. For example, communication encryption rules, or portions thereof, such as rule conditions, content mappings, or both, may be validated and processed into data structures that represent the data encodings that each of the parts of the communication encryption rules correspond with.

In some embodiments, selective encryption at 920 may include communication encryption rule processing at 922, data encryption rule processing at 924, or a combination thereof.

In some embodiments, communication encryption rule processing at 922, which may be implemented in a declarative encryption rules engine, may include processing, scanning, or inspecting the outbound data to identify matchable portions of the outbound data, and a corresponding event may be generated for each matchable portion identified. In some embodiments, the events may be passed to rule evaluation data structures. In some embodiments, a rule evaluation data structure may receive an event, determine whether the event matches a communication encryption rule, and may indicate whether the event matches a communication encryption rule.

In some embodiments, data encryption rule processing at 924, which may be implemented in a transformation engine, may include receiving the matching rules identified by the communication encryption rule processing at 922, and evaluating the matching rules based on data encryption configuration information, such as the data encryption configuration information generated as shown at 400 in FIG. 4, and in FIGS. 5-6, or a synchronized as shown at 420 in FIG. 4.

In some embodiments, data encryption rule processing at 924 may include identifying the content mapping information indicated by the content mapping portion of the matching rules identified at 922. For example, the content mapping information may include data storage mapping information, which may include a data storage table, a data storage field, or both.

In some embodiments, data encryption rule processing at 924 may include identifying data encryption configuration information, such as the data encryption configuration information generated as shown at 400 in FIG. 4, and in FIGS. 5-6, corresponding to the data storage mapping information indicated by the identified matching rules.

In some embodiments, data encryption rule processing at 924 may determining, for each matching content mapping whether the corresponding data encryption configuration information indicates that the corresponding content is sensitive information, configured for encryption.

In some embodiments, one or more portions of the outbound communication may be identified as unmatched at 922, which may indicate that the configured communication encryption rules did not match the respective portions of the outbound communication, and may be included in an output data stream as received.

In some embodiments, one or more portions of the outbound communication may be identified as matching at 922, one or more portions of the matching data may be identified as insensitive at 924, and the insensitive portions may be included in an output data stream as received. For example, the outbound communication shown in Example 1 may be identified as matching at 922, which may indicate that the value "Example Sensitive Content" is identified as candidate sensitive information, the data encryption configuration information evaluated at 924 may indicated that a data container for storing the value "Example Sensitive Content" is configured as insensitive, and the value "Example Sensitive Content" may be included in the output data stream as received.

In some embodiments, one or more portions of the outbound communication may be identified as matching at 922, one or more portions of the matching data may be identified as sensitive at 924, and the sensitive portions, as received, may be omitted from the output data stream, may be encrypted, and the corresponding encrypted data may be included in the outbound data stream in place of the sensitive information. For example, the outbound communication shown in Example 1 may be identified as matching at 922, which may indicate that the value "Example Sensitive Content" is identified as candidate sensitive information, the data encryption configuration information evaluated at 924 may indicated that a data container for storing the value "Example Sensitive Content" is configured as sensitive, the value "Example Sensitive Content" may be encrypted to generate the encrypted content "$$ENCRYPTED DATA$$", and the encrypted content "$$ENCRYPTED DATA$$" may be included in the output data stream in place of the value "Example Sensitive Content". The encrypted content is represented herein as "$$ENCRYPTED DATA$$" for simplicity and clarity; however, "$$ENCRYPTED DATA$$" does not necessarily indicate the actual encrypted content.

In some embodiments, the partially, or selectively, encrypted data generated at 920 may be output at 930. For example, the outbound data may be addressed to an external device, such as a server 332/334/342/344 as shown in FIG. 3, and the proxy may send the selectively encrypted data to the external device.

In an example, the partially, or selectively, encrypted output corresponding to the outbound communication indicated b Example 1 may be expressed as follows:

POST http://example.com
sysparam_data=[{"action":"Post",
"args":{"_isModelCall":true,"intention":"INSERT"},
"data":{"message":"$$ENCRYPTED DATA$$"}}].

Although not expressly shown in FIG. 4 or 9, in some embodiments, the edge encryption proxy may receive an inbound communication from the external device, the inbound communication may identify the client as a recipient of the inbound communication, and may include a partially encrypted data stream. The inbound partially encrypted data stream may include unencrypted data, such as unencrypted input portions, and the encrypted data generated at 920. The edge encryption proxy may decrypt the encrypted data, may generate a decrypted data stream including the decrypted data and the unencrypted data, and may transmit the decrypted data stream to the client.

All or a portion of aspects of the invention described herein can be implemented using a general purpose computer/processor with a computer program that, when executed, carries out any of the respective techniques, algorithms and/or instructions described herein. In addition, or alternatively, for example, a special purpose computer/processor can be utilized which can contain specialized hardware for carrying out any of the techniques, algorithms, or instructions described herein.

The implementations of computing devices as described herein (and the algorithms, methods, instructions, etc., stored thereon and/or executed thereby) can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors or any other suitable circuit. In the claims, the term "processor" should be understood as encompassing any of the foregoing hardware, either singly or in combination.

For example, one or more computing devices can include an ASIC or programmable logic array such as a field-programmable gate array (FPGA) configured as a special-purpose processor to perform one or more of the operations or operations described or claimed herein. An example FPGA can include a collection of logic blocks and random access memory (RAM) blocks that can be individually configured and/or configurably interconnected in order to cause the FPGA to perform certain functions. Certain FPGA's may contain other general or special purpose blocks as well. An example FPGA can be programmed based on a hardware definition language (HDL) design, such as VHSIC Hardware Description Language or Verilog.

The embodiments herein may be described in terms of functional block components and various processing operations. Such functional blocks may be realized by any number of hardware and/or software components that perform the specified functions. For example, the described embodiments may employ various integrated circuit components, e.g., memory elements, processing elements, logic elements, look-up tables, and the like, which may carry out a variety of functions under the control of one or more microprocessors or other control devices. Similarly, where the elements of the described embodiments are implemented using software programming or software elements the invention may be implemented with any programming or scripting language such as C, C++, Java, assembler, or the like, with the various algorithms being implemented with any combination of data structures, objects, processes, routines or other programming elements. Functional aspects may be implemented in algorithms that execute on one or more processors. Furthermore, the embodiments of the invention could employ any number of conventional techniques for electronics configuration, signal processing and/or control, data processing and the like. The words "mechanism" and "element" are used broadly and are not limited to mechanical or physical embodiments, but can include software routines in conjunction with processors, etc.

Implementations or portions of implementations of the above disclosure can take the form of a computer program product accessible from, for example, a computer-usable or computer-readable medium. A computer-usable or computer-readable medium can be any device that can, for example, tangibly contain, store, communicate, or transport a program or data structure for use by or in connection with any processor. The medium can be, for example, an electronic, magnetic, optical, electromagnetic, or a semiconductor device. Other suitable mediums are also available. Such computer-usable or computer-readable media can be referred to as non-transitory memory or media, and may include RAM or other volatile memory or storage devices that may change over time. A memory of an apparatus described herein, unless otherwise specified, does not have to be physically contained by the apparatus, but is one that can be accessed remotely by the apparatus, and does not have to be contiguous with other memory that might be physically contained by the apparatus.

The word "example" is used herein to mean serving as an example, instance, or illustration. Any aspect or design described herein as "example" is not necessarily to be construed as preferred or advantageous over other aspects or designs. Rather, use of the word "example" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. In other words, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one implementation" throughout is not intended to mean the same embodiment or implementation unless described as such.

The particular implementations shown and described herein are illustrative examples of the invention and are not intended to otherwise limit the scope of the invention in any way. For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. Many alternative or additional functional relationships, physical connections or logical connections may be present in a practical device. Moreover, no item or component is essential to the practice of the invention unless the element is specifically described as "essential" or "critical".

The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The use of the terms "a" and "an" and "the" and similar referents in the context of describing the invention (especially in the context of the following claims) should be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein. Finally, the operations of all methods described herein are performable in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed.

All references, including publications, patent applications, and patents, cited herein are hereby incorporated by reference to the same extent as if each reference were individually and specifically indicated as incorporated by reference and were set forth in its entirety herein.

The above-described embodiments have been described in order to allow easy understanding of the present invention and do not limit the present invention. To the contrary, the invention is intended to cover various modifications and equivalent arrangements included within the scope of the appended claims, which scope is to be accorded the broadest interpretation so as to encompass all such modifications and equivalent structure as is permitted under the law.

What is claimed is:

1. A method, comprising:
    storing encryption rules and content mappings in memory;
    intercepting, at an edge encryption proxy, an unencrypted data stream directed to a target device outside of a network on which the edge encryption proxy is located;
    parsing the unencrypted data stream to identify a candidate sensitive portion of the unencrypted data stream;
    identifying a rule condition of the encryption rules and a content mapping of the content mappings corresponding to the candidate sensitive portion;
    determining whether the candidate sensitive portion includes sensitive data using the encryption rules and the content mapping, wherein the content mapping indicates a path to the sensitive data, and wherein the rule condition comprises an operand reference, a relational operator, and a target value;
    responsive to the candidate sensitive portion including the sensitive data, encrypting the sensitive data;
    replacing the candidate sensitive portion with the encrypted sensitive data; and
    transmitting the encrypted sensitive data with remaining portions of the unencrypted data stream to the target device.

2. The method of claim 1, wherein parsing the unencrypted data stream comprises determining that the candidate sensitive portion pertains to data derived from a configured storage location in the network.

3. The method of claim 2, wherein the configured storage location comprises a database.

4. The method of claim 2, wherein the configured storage location comprises a column, field, or table.

5. The method of claim 2, wherein the configured storage location is defined in the encryption rules.

6. The method of claim 1, wherein the edge encryption proxy provides a transition from a relatively secured portion including the network to a relatively unsecured portion between the edge encryption proxy and the target device.

7. The method of claim 6, wherein the relatively unsecured portion comprises the Internet.

8. The method of claim 1, wherein the encryption rules stored in memory comprise:
    a selective encryption configuration table storing information about storage locations for the unencrypted data stream; and
    a communication encryption configuration database storing information about various rules determining when to secure the unencrypted data stream for various transmissions.

9. The method of claim 8, wherein the memory is located on the network.

10. The method of claim 8, comprising, receiving at the edge encryption proxy the encryption rules, wherein the memory is located outside the network.

11. The method of claim 1, wherein receiving the unencrypted data stream includes receiving the unencrypted data stream from an in-network device in the network.

12. The method of claim 1, wherein encrypting the sensitive data comprises maintaining the sensitive data in the network without the encryption while using the encrypted sensitive data in communications with the target device.

13. The method of claim 1, comprising:
    receiving partially encrypted data at the edge encryption proxy;
    decrypting encrypted portions of the partially encrypted data using the edge encryption proxy; and
    utilizing the decrypted portions of the partially encrypted data as unsecured data in the network.

14. A tangible, non-transitory, and computer-readable medium having stored thereon instructions, that when executed, are configured to cause one or more processors to:
    store encryption rules and content mapping in memory;
    intercept, at an edge encryption proxy, an unencrypted data stream directed to a target device outside of a network on which the edge encryption proxy is located;
    identify a candidate sensitive portion of the unencrypted data stream as potential sensitive data;
    identify a rule condition of the encryption rules and the content mapping corresponding to the candidate sensitive portion;
    determine whether the candidate sensitive portion includes sensitive data using the rule condition and the content mapping, wherein the content mapping indicates a path to the sensitive data, and wherein the rule condition comprises an operand reference, a relational operator, and a target value;
    responsive to the candidate sensitive portion including the sensitive data, encrypt the sensitive data;
    replace the candidate sensitive portion with the encrypted sensitive data; and
    transmit the encrypted sensitive data with remaining portions of the unencrypted data stream to the target device.

15. The tangible, non-transitory, and computer-readable medium of claim 14, wherein the encryption rules stored in memory comprise:

a selective encryption configuration table storing information about storage locations for the unencrypted data stream; and a communication encryption configuration database storing the rule condition.

16. The tangible, non-transitory, and computer-readable medium of claim 14, wherein determining whether the candidate sensitive portion includes the sensitive data using the rule condition comprises:

identifying the rule condition matching the candidate sensitive portion of the unencrypted data stream based on the operand reference; and determining that the rule condition is met in the unencrypted data stream on a condition of the candidate sensitive portion having a relationship to the target value, wherein the relationship is by the relational operator.

17. The tangible, non-transitory, and computer-readable medium of claim 14, wherein the rule condition comprises communication of the unencrypted data stream is to take place over hypertext transfer protocol using at least one of a type of communication, a uniform resource locator, and request method indicated in the encryption rules.

18. A system comprising:

one or more processors; and a memory storing instructions that, when executed, are configured to cause the one or more processors to:

store encryption rules in a table storing information indicating secured memory locations that are to be secured in communications outside of a network;

intercept, at an edge encryption proxy, an unencrypted data stream directed to a target device outside of the network including data derived from the secured memory locations, wherein the edge encryption proxy is located in the network;

identify a rule condition of the encryption rules and a content mapping, wherein the rule condition comprises an operand reference, a relational operator, and a target value;

identify at least a portion of the unencrypted data stream derived from the secured memory locations as containing sensitive data using the rule condition and the content mapping indicating a path to the sensitive data;

encrypt the data derived from the secured memory locations using the encryption rules;

replace unencrypted data from the secured memory locations with the encrypted data to form a partially encrypted stream with portions of the unencrypted data stream not derived from the indicated secured memory locations; and transmit partially encrypted stream to the target device.

19. The system of claim 18, wherein the secured memory location comprises a column, field, or table.

* * * * *

UNITED STATES PATENT AND TRADEMARK OFFICE
CERTIFICATE OF CORRECTION

PATENT NO. : 11,411,939 B2
APPLICATION NO. : 16/417289
DATED : August 9, 2022
INVENTOR(S) : Antonio Ye and Kyle Barron-Kraus It is certified that error appears in the above-identified patent and that said Letters Patent is hereby corrected as shown below:

In the Claims

Column 25, Line 17, Claim 16; insert --described-- after "is" and before "by".

Column 26, Line 24, Claim 18; insert --the-- before "partially".

Column 26, Line 27, Claim 19; replace "location" with --locations--.

Signed and Sealed this
Twenty-seventh Day of December, 2022

*Katherine Kelly Vidal*

Katherine Kelly Vidal
*Director of the United States Patent and Trademark Office*